(12) United States Patent
Fukasaku et al.

(10) Patent No.: US 7,352,097 B2
(45) Date of Patent: Apr. 1, 2008

(54) MOTOR OR GENERATOR AND METHOD OF PRODUCING THE SAME

(75) Inventors: Hiroshi Fukasaku, Aichi-ken (JP); Kiyoshi Uetsuji, Aichi-ken (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 10/965,497

(22) Filed: Oct. 14, 2004

(65) Prior Publication Data

US 2005/0082933 A1     Apr. 21, 2005

(30) Foreign Application Priority Data

Oct. 20, 2003   (JP) ............... 2003-359573

(51) Int. Cl.
*H02K 3/28* (2006.01)
*H02K 15/085* (2006.01)
*H02K 3/50* (2006.01)

(52) U.S. Cl. .................. 310/180; 310/71; 310/184
(58) Field of Classification Search ................ None
See application file for complete search history.

(56) References Cited

U.S. PATENT DOCUMENTS

| | | | | |
|---|---|---|---|---|
| 1,144,252 A | * | 6/1915 | Roebel | 310/213 |
| 2,055,595 A | * | 9/1936 | Surjaninoff | 310/87 |
| 3,566,171 A | * | 2/1971 | Tichy et al. | 310/180 |
| 5,327,637 A | * | 7/1994 | Breitenbach et al. | 29/596 |
| 6,313,409 B1 | * | 11/2001 | Bales et al. | 174/128.1 |

FOREIGN PATENT DOCUMENTS

| | | | |
|---|---|---|---|
| JP | 58-033945 | | 2/1983 |
| JP | 09-191588 | | 7/1997 |
| JP | 10-229665 | * | 8/1998 |
| JP | 2000-164043 | * | 6/2000 |
| JP | 2002-186212 | | 6/2002 |
| JP | 2003-047189 | | 2/2003 |

* cited by examiner

*Primary Examiner*—Burton Mullins
(74) *Attorney, Agent, or Firm*—Morgan & Finnegan, L.L.P.

(57) ABSTRACT

A plurality of slots are provided at a stator core. A coil component is produced by winding conductor wires around a forming tool several times. The coil component is cut off at a predetermined part and inserted into a slot so as to cross over the plurality of slots. Then, a coil is formed by connecting the corresponding conductor wires at cut surfaces of the coil component.

4 Claims, 11 Drawing Sheets

F I G. 1A
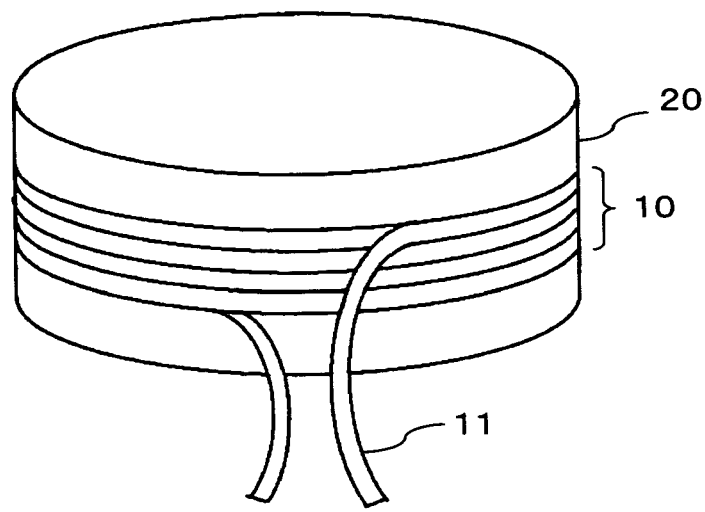
F I G. 1B
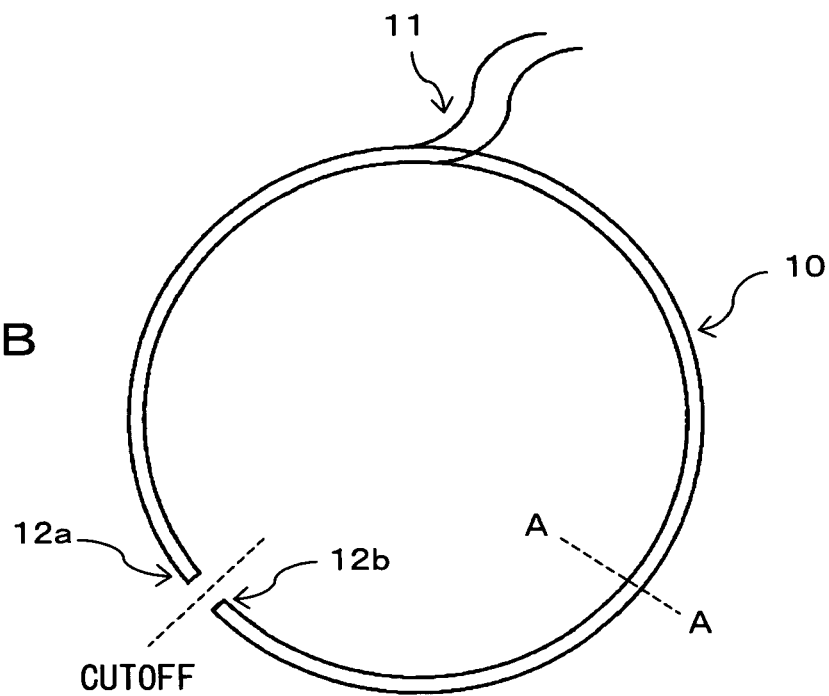

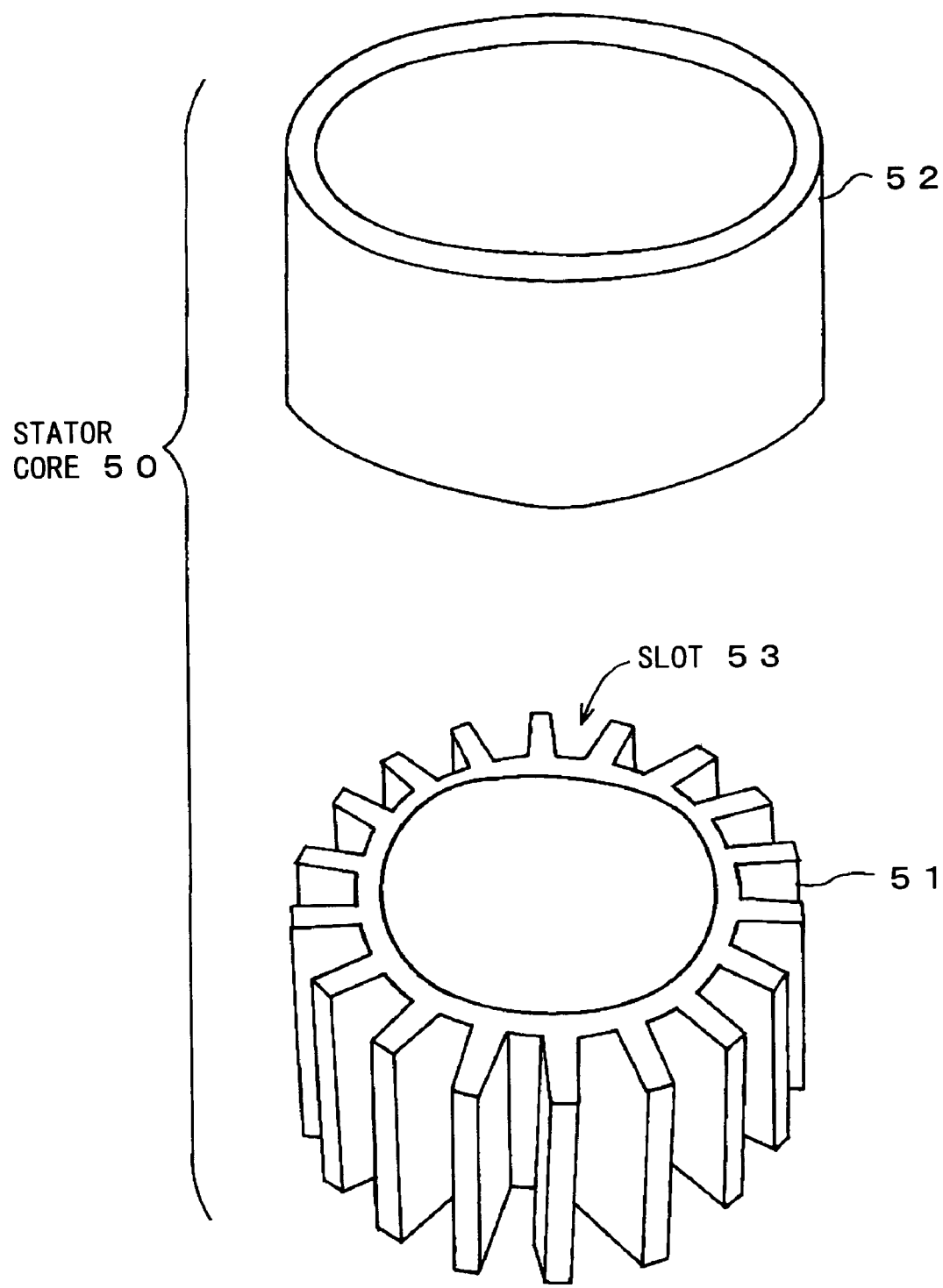
F I G. 2

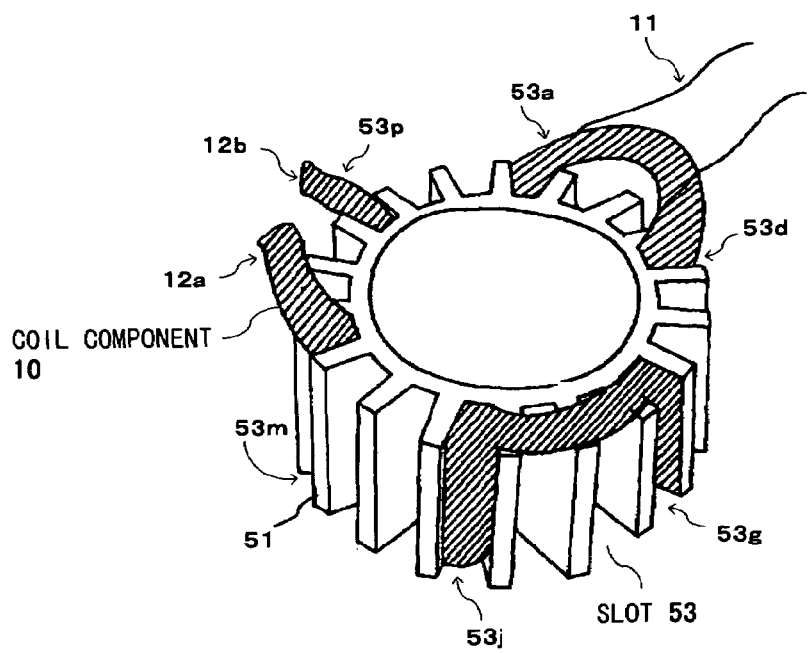
F I G. 4 A
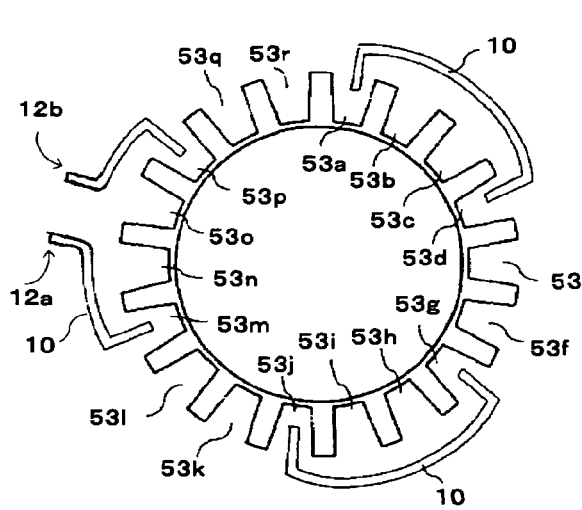
F I G. 4 B
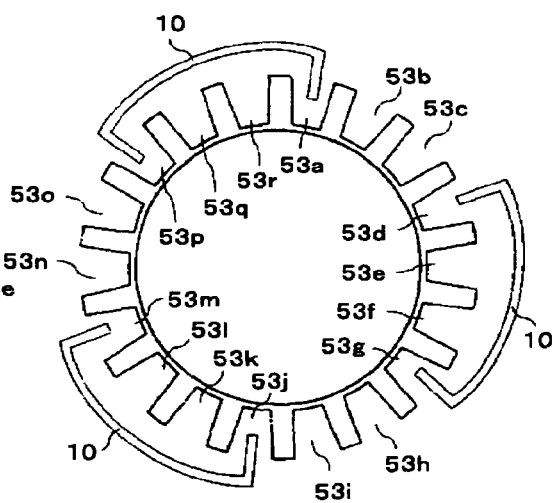
F I G. 4 C

CROSS-SECTION A-A

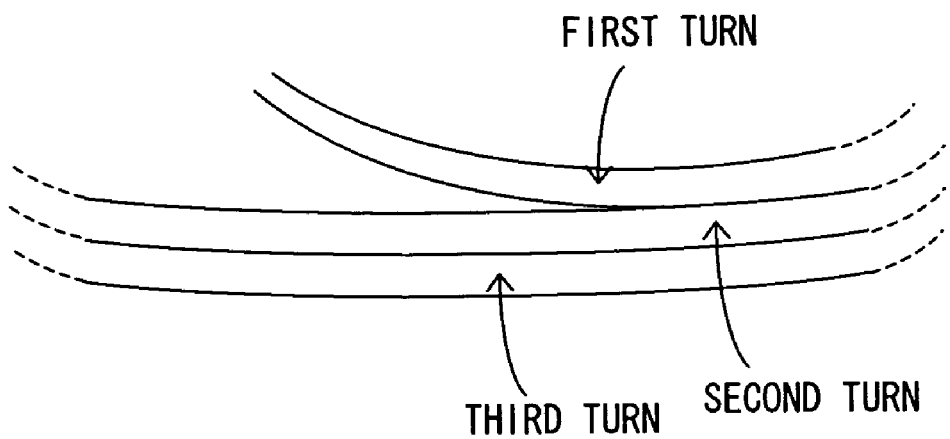
F I G. 8 A
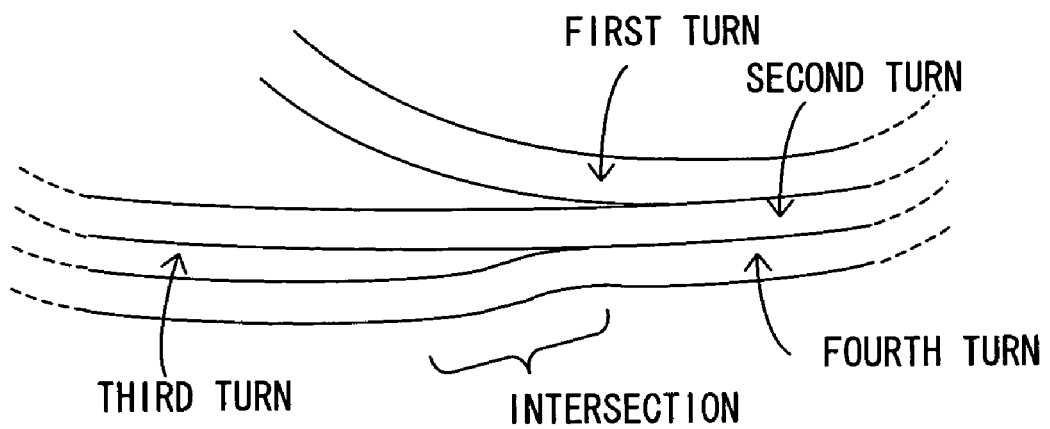
F I G. 8 B

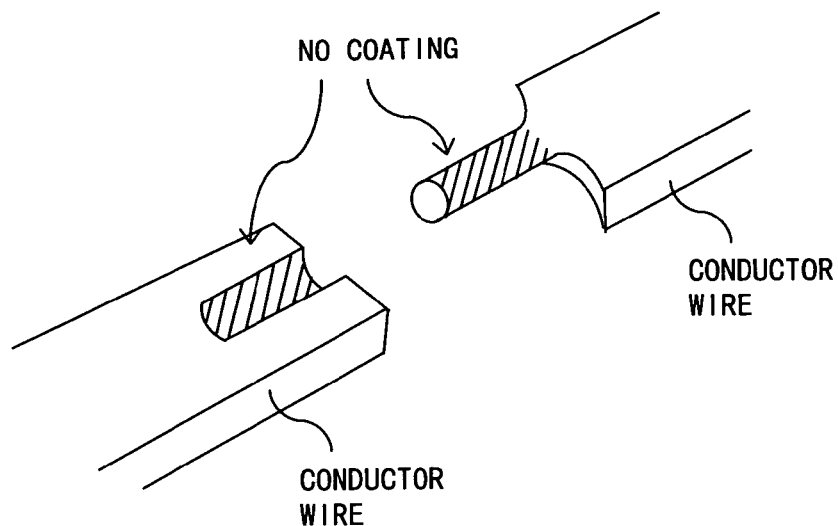
F I G. 10A
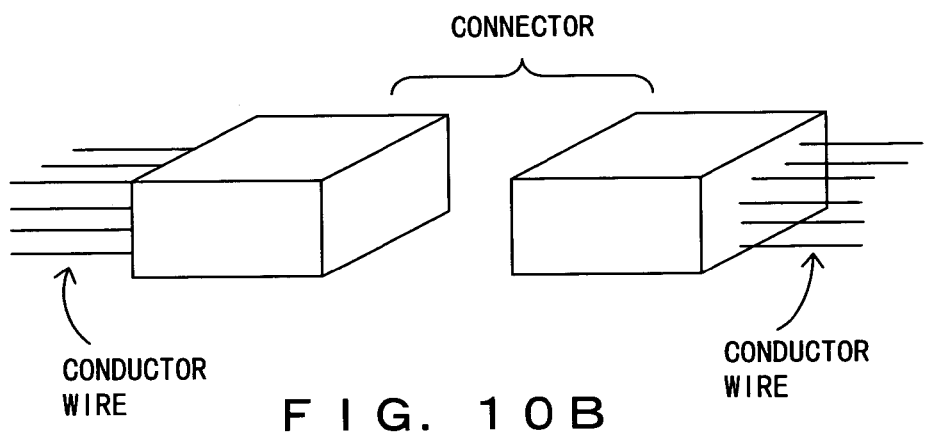
F I G. 10B
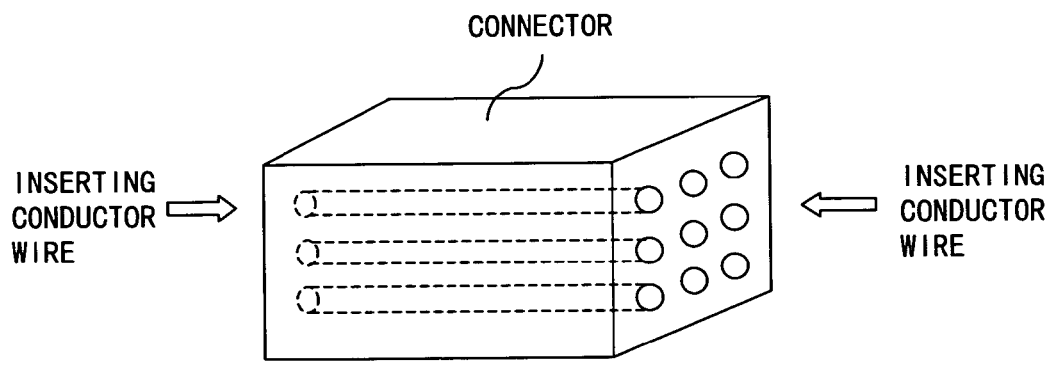
F I G. 10C

MOTOR OR GENERATOR AND METHOD OF PRODUCING THE SAME

BACKGROUND OF THE INVENTION

1. Field of the Invention

The present invention relates to a motor and a generator of which the armature is wound by a coil and also relates to a method thereof.

2. Description of the Related Art

A rotating electrical unit has been conventionally and widely used in various fields. Here, the rotating electrical unit includes a motor and a generator. The use of the rotating electrical unit is not limited but here it is used as, for example, a motor for driving the compressor of an air conditioner, a motor for running an electric vehicle (including a hybrid car), a generator mounted on a car, etc.

The rotating electrical unit is generally provided with a coil for generating a magnetic field (in the case of a generator, a coil for generating electromotive force in accordance with the change of a flux). The following method is well known as a method of forming a conventional wire.

For example, in a rotating electrical unit described in patent document 1, a coil is formed by repeatedly winding a conductor wire around the slot of a stator. This stator includes a plurality of stator pieces and these stator pieces are combined after a coil is formed for each stator piece. Therefore, this method has a merit such that a winding operation becomes easier in comparison with a method of winding a conductor wire around the slot provided on a cylindrical stator core.

In addition, in patent document 2, a technology called insert method is described. In the insert method, a coil is produced in advance by winding one conductor wire several times around a ring-shaped frame, etc. and this ring-shaped coil is inserted into the slot corresponding to a stator core using a device called an inserter. According to this insert method, since a conductor wire need not be wound directly around a slot of the stator core, the operation of forming a coil becomes easier.

[Patent Document 1]
Japanese patent laid-open application publication 9-191588 (FIGS. 1 and 2, paragraphs 0023 to 0030).

[Patent Document 2]
Japanese patent laid-open application publication 58-33945 (pages 1 and 2).

In a case where a coil is formed by winding a conductor wire directly around a slot provided at a stator core (especially, in a case where a slot is provided on an inner circumference side of a cylindrical stator core), the labor for a winding operation increases. In the method described in patent document 1, this problem is alleviated. According to the method described in patent document 1, however, it is interpreted that the configuration of a stator core is complicated and the coil is limited to a concentrated winding.

In the insert method described in the patent document 2, an inserter itself is a relatively large-scale and also expensive device. Especially in a case where a stator core has a long cylindrical shape, a coil can be hardly inserted into the corresponding slot.

SUMMARY OF THE INVENTION

The present invention aims at easily configuring the coil of a motor and a generator.

The production method of a motor and a generator (or an armature) of the present invention includes a step of forming a coil component by repeatedly winding a conductor wire around a forming tool, a step of cutting off the coil component at a predetermined part, a step of inserting the cut-off coil component into a slot provided at an armature iron core so as to cross over a plurality of slots and a step of forming a coil of an armature by electrically connecting ends of the plurality of conductor wires for configuring the coil component, at cut surfaces of the cut-off coil component.

According to this production method, a coil component formed using the forming tool is cut off at a predetermined part and becomes cable-form. Then, a coil is formed by installing the cable-form coil component at an armature iron core and electrically connecting the ends of the conductor wires at the cut surfaces of the coil component. Therefore, a coil can be formed without directly winding a conductor wire around the armature iron core. Furthermore, since the cable-form coil component is inserted into a corresponding slot so as to cross over a plurality of slots, a large-scale device such as a device used in the insert method is not required.

In a step of forming the coil component, the above-mentioned conductor wire may be wound around the forming tool in such a way that the cross-section shape of the coil component approximately matches with that of the slot. In this case, the lamination (or density) factor of the conductor wires increases in a slot, the efficiency of a motor or a generator is improved. Meanwhile, according to this production method, since a pre-formed coil component is installed at an armature iron core, a plurality of conductor wires can be aligned so as to approximately match with the cross-section shape of the slot. In addition, if a flat conductor wire is used as the conductor wire, the lamination factor of the conductor wires can be further increased.

In the above-mentioned production method, the cut-off coil component may be inserted into a corresponding slot so as to cross over a plurality of slots in such a way that the coil to be formed becomes a wave winding. According to this method, a wave winding coil can be easily configured.

Furthermore, in the production step of the coil component, the conductor wires may be wound around the forming tool so as not to intersect with each other at a part where the conductor wires are inserted into a slot. According to this method, the lamination factor of conductor wires does not decrease in a slot.

A motor or a generator of the present invention include an armature wound by a conductor wire. The armature includes an armature iron core provided with a plurality of slots and a coil component formed by repeatedly winding a conductor wire around a forming tool. After the above-mentioned coil component is installed at the armature electric iron core while being cut off at the predetermined part, the ends of the conductor wires forming the coil component are electrically connected at the cut surfaces. Meanwhile, the motor and the generator produced according to this invention can obtain the same effect by implementing the same operation as that of the above-mentioned production method. In the motor and the generator, regarding a coil component, ends of conductor wires forming the coil component may be electrically connected by a connector at the cut surfaces.

According to the present invention, a coil can be formed by cutting off the pre-formed coil component at a predetermined part, installing the cut-off coil component at an armature iron core and electrically connecting ends of the conductor wires at the cut surfaces of the coil component.

Therefore, the operation of forming a coil is simple so that expensive and large-scale equipment is not required.

Furthermore, according to the present invention, since a coil component to be inserted into the slot of an armature iron core can be separately formed, it is easy to align a plurality of conductor wires so as to approximately match with a cross-section shape of the slot. Accordingly, the lamination factor of conductor wires can be increased in the slot so that the efficiency of a motor or a generator can be improved.

BRIEF DESCRIPTION OF THE DRAWINGS

FIGS. 1A and 1B explain a production method of a coil component used for the production of a rotating electrical unit of the embodiment of the present invention;

FIG. 2 is a decomposition perspective view of a stator core of the embodiment of the present invention;

FIGS. 4A to 4C show the condition in which a coil component is inserted into a slot of the stator core;

FIGS. 8A and 8B show states such that conductor wires intersect with each other when forming a coil component;

FIGS. 10A to 10C explain methods of connecting ends of conductor wires; and

DESCRIPTION OF THE PREFERRED EMBODIMENTS

Figure 3:
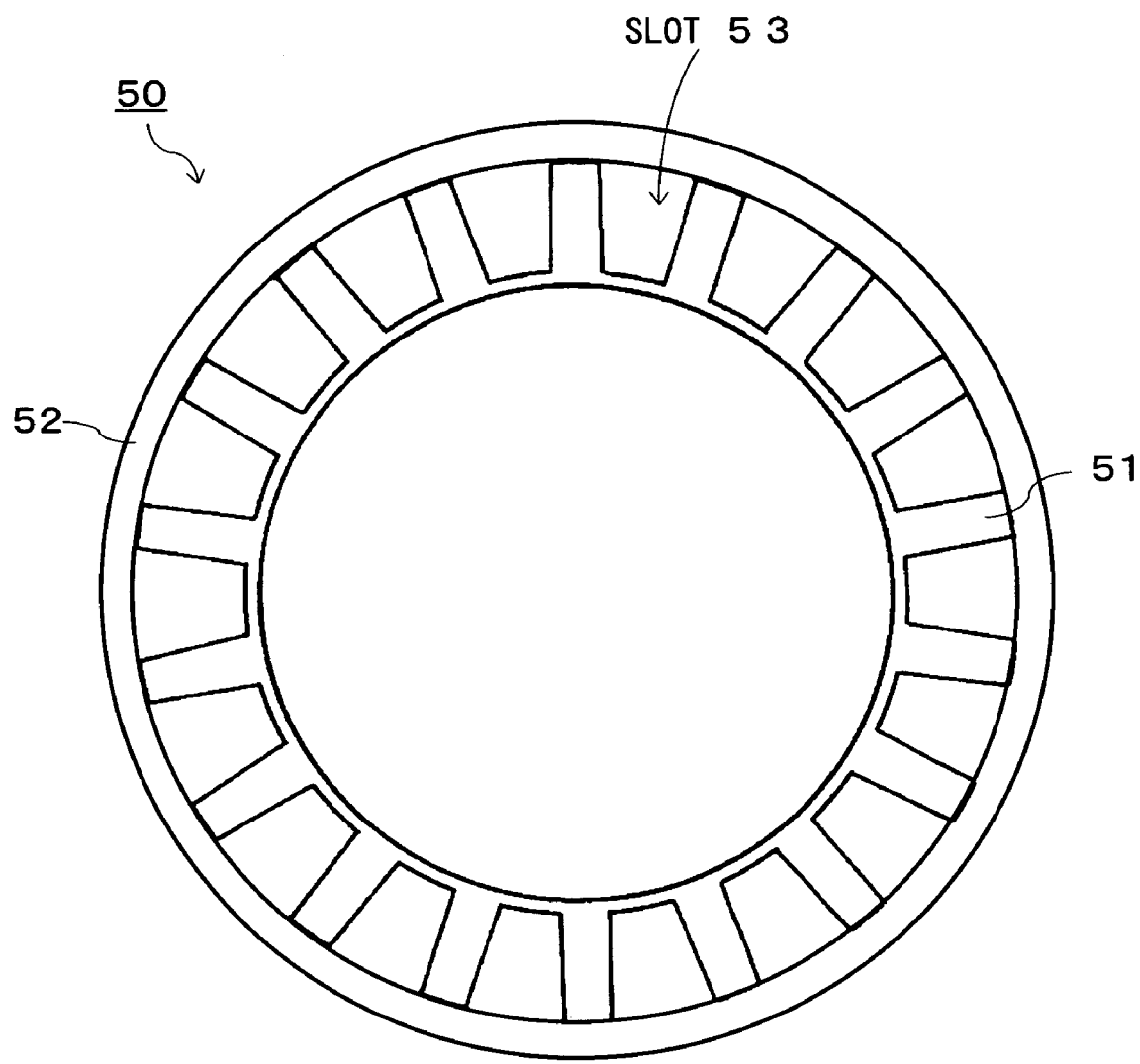
FIG. 3 shows the stator core shown in FIG. 2 viewed from above.

The following is the explanation of the embodiment of the present invention in reference to the drawings. The explanation is given only for the case where the present invention is applied to a synchronous machine functioning as a rotating electrical unit. Here, the rotating electrical unit of the embodiment includes a motor and a generator. In the following, a case such that the rotating electrical unit is a three-phase rotating electrical unit and the number of poles of each phase is "6" is adopted to be explained.

The rotating electrical unit of the embodiment includes a stator and a rotor each functioning as an armature similarly to a general rotating electrical unit, but the configuration of the rotor is not characteristic. Therefore, the configuration of the rotor is omitted. Incidentally, steps other than the step of producing a stator may be realized by a general technology or a publicly known technology.

FIGS. 1A and 1B explain a production method of a coil component used for the production of a rotating electrical unit of the embodiment of the present invention.

As shown in FIG. 1A, a coil component 10 of the embodiment is formed by repeatedly winding a conductor wire 11 around a forming tool 20. The shape of the forming tool 20 is not especially limited here, but the length of the outer-circumference of the forming tool 20 is determined by the shape of a stator core, etc. on which the coil component 10 of the armature iron core of a rotating electrical unit is installed.

The conductor wire 11 is, for example, a copper wire and this wire is insulation-coated. The cross-section shape of each conductor wire 11 is, for example, circular (or substantially circular) or rectangular (or substantially rectangular). Hereinafter, a conductor wire having a circular cross-section shape is sometimes called a "circular conductor wire", while that having a rectangular or an approximately rectangular cross-section shape is sometimes called a "flat conductor wire".

Subsequently, the thus-formed coil component 10 is cut off at the predetermined part as shown in FIG. 1B. At this time, it is preferable to tentatively fix the conductor wires 11 in order to prevent these wires 11 forming the coil component 10 from being separated. Meanwhile, the cutoff parts of the coil component 10 are sometimes called end portions 12a and 12b.

FIG. 2 is a decomposition oblique perspective view of a stator core of embodiment. A stator core 50 includes an inner-circumference member 51 and an outer-circumference member 52 as shown in FIG. 2. The inner-circumference member 51 is provided with a plurality of protruding portions that respectively project in a radial direction. Each slot 53 is formed between these protruding portions. On the other hand, the outer-circumference member 52 is shaped like a cylinder and fixed to the inner-circumference member 51 to wrap this member.

FIG. 3 is a diagram when the stator core 50 is viewed from the top. Here, the diagram shows a condition in which the outer-circumference member 52 is fixed on the outer side of the inner-circumference member 51. The stator core 50 is provided with a plurality (in this example, 18 pieces) of slots 53. The cross-section shape of the slot 53 is a trapezoid (or fan shape) in this example.

The following is the explanation of procedures for installing the thus-formed coil component 10 at a stator core as shown in FIGS. 1A and 1B. In the following explanation, it is assumed that the coil component 10 is installed at the stator cores 50 as shown in FIGS. 2 and 3.

FIGS. 4A to 4C show a condition in which the coil component 10 is inserted into the corresponding slot of the stator core. Here, FIGS. 4A, 4B and 4C are an oblique perspective view, a pattern diagram of a coil component installed on the topside of the stator core and a pattern diagram of a coil component installed on the downside of the stator core, respectively. In order to clarify the drawings, the outer-circumference member 52 is omitted here. Furthermore, in order to realize a three-phase rotating electrical unit, three coil components 10 must be installed at the stator core, but only one coil component 10 is drawn in these drawings.

The thus-formed coil component 10 is inserted into six corresponding slots at intervals of three slots. Specifically, one of the coil components 10 is sequentially inserted into the slots 13a, 13p, 13m, 13j, 13g and 13d among eighteen slots 13a to 13r provided at the stator core 50. At this time, in the examples as shown in FIGS. 4A to 4C, the end portion 12a of the coil component 10 is pulled out from the upper end of a slot 53m while the end portion 12b of the coil component 10 is pulled out from the upper end of a slot 53p. In this embodiment, the coil component 10 crosses over a plurality of slots so as to form a wave winding according to the following route.

End portion 12a of coil component 10 upper end of slot 53m→slot 53m→lower end of slot 53m→lower end of slot 53j→slot 53j→upper end of slot 53j→upper end of slot 53g→slot 53g→lower end of slot 53g→lower end of slot 53d→slot 53d→upper end of 53d→upper end of slot 53a→slot 53a→lower end of slot 53a→lower end of slot 53p→slot 53p→upper end of slot 53p→end portion 12b of coil component 10.

Figure 5:
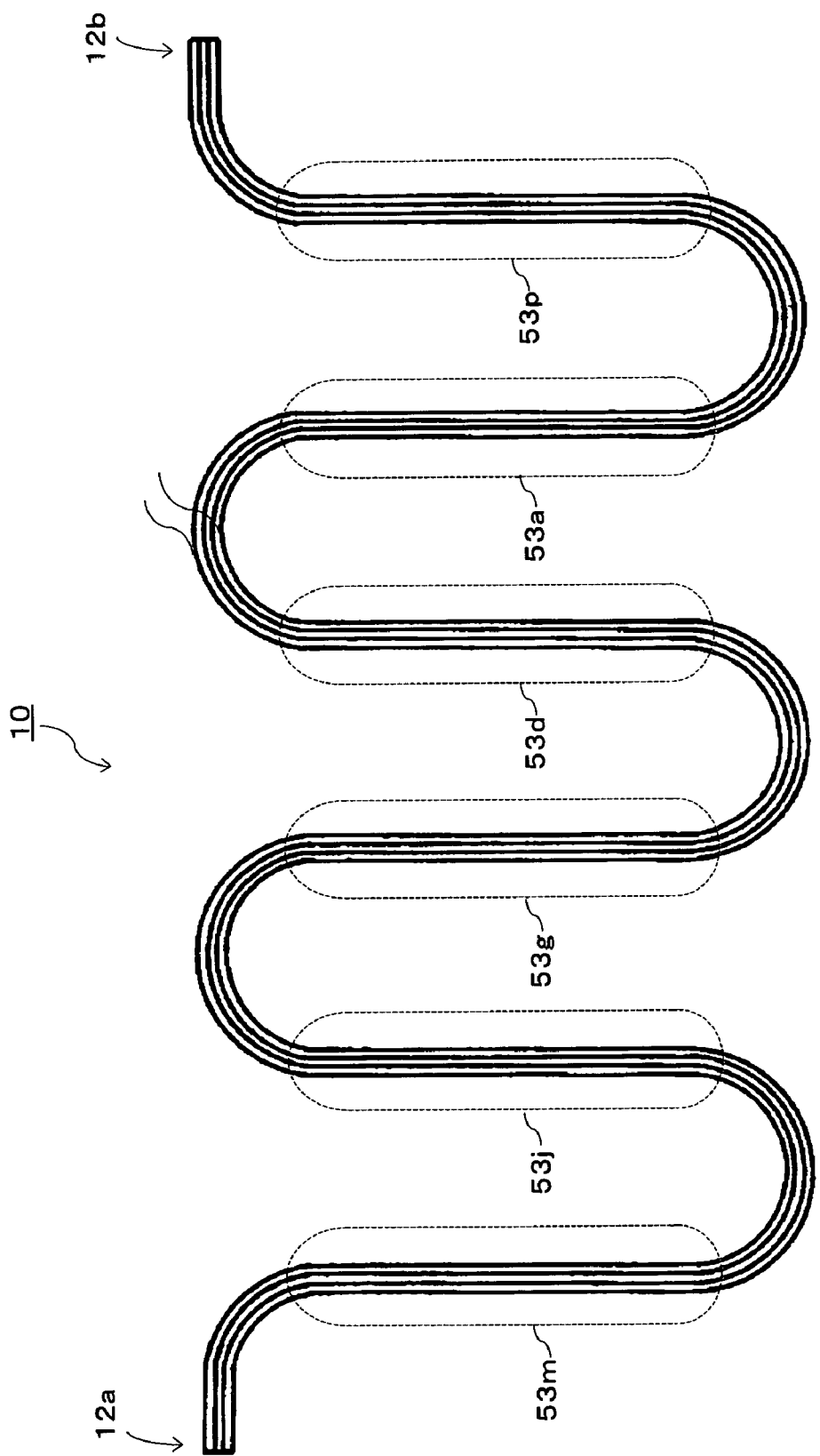
FIG. 5 is a pattern diagram showing a condition in which a coil component is inserted into a corresponding slot of the stator core.

FIG. 5 is a pattern diagram showing a condition in which the coil component 10 is inserted into corresponding slots of the stator core 50. In this way, the coil component 10 crosses over a plurality of slots 53m, 53j, 53g, 53d, 53a and 53p like a wave.

Figure 6:
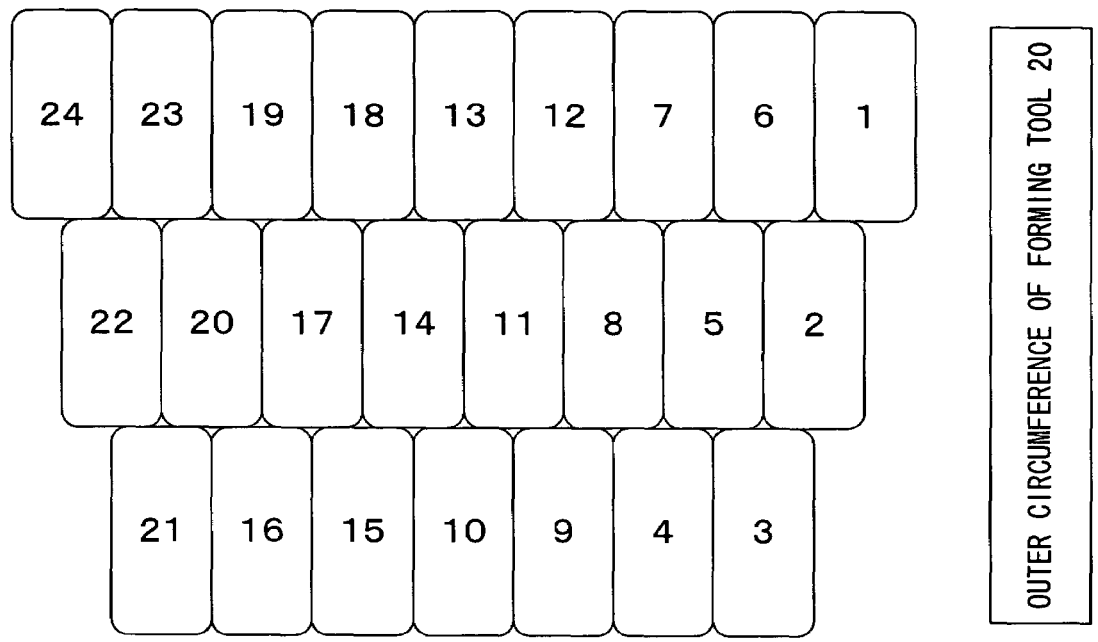
FIG. 6 shows a cross-section shape of the coil component.
Figure 6:
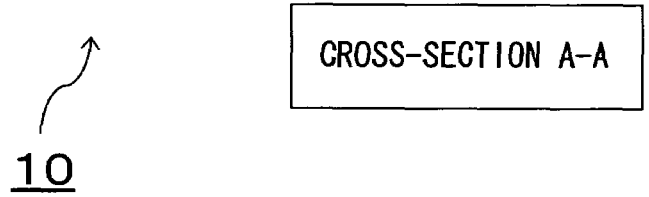

FIG. 6 shows a cross-section shape of the coil component 10. Here, the cross-section of the coil component 10 is illustrated in the case where the cross-section shape of a slot of the stator core 50 is trapezoidal (refer to FIGS. 2 and 3). In addition, the conductor wire 11 is a flat conductor wire.

The coil component 10 is formed by repeatedly winding the conductor wire 11 around the outer-circumference of the forming tool 20. In the example shown in FIG. 6, the conductor wire 11 is wound by twenty-four turns. At this time, the conductor wire 11 is wound in such a way that the cross-section shape of the coil component 10 approximately matches with the cross-section shape of each slot 53 provided at the stator core 50. Furthermore, the conductor wire 11 is wound so as to align in a predetermined order in the cross-section of the coil component 10. The numbers "1" to "24" assigned in FIG. 6 indicate the arrangement order of the conductor wires 11.

Figure 7A:
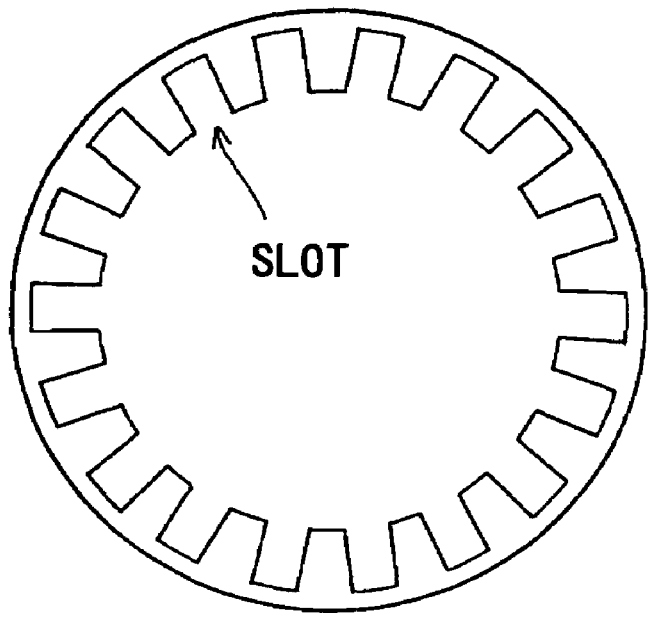
FIG. 7A shows a stator core of another embodiment of the present invention.
Figure 7B:
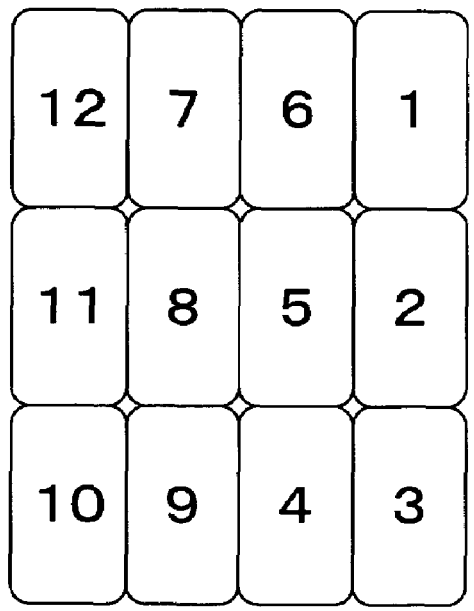
FIG. 7B shows a cross-section shape of the coil component inserted into a slot of the stator core shown in FIG. 7A.

FIG. 7A shows a stator core of another embodiment of the present invention and FIG. 7B shows the cross-section shape of a coil component to be inserted into a slot of the stator core as shown in FIG. 7A. In the embodiment as shown in FIG. 2, the coil component 10 is inserted into a corresponding slot from an outer-circumference side of the stator core, while in the embodiment as shown in FIG. 7A, the coil component 10 is inserted into a corresponding slot from an inner-circumference side of the stator core.

In respect of the stator core shown in FIG. 7A, a cross-section shape of the slot is approximately rectangular. In this case, a cross-section shape of the coil component 10 is made approximately a rectangular shape. That is, also in this case, the conductor wire is wound in such a way that the cross-section shape of the conductor wire approximately matches with the cross-section shape of each slot provided at the stator core.

In this way, the conductor wire 11 is wound in such a way that the cross-section shape of the coil component 10 approximately matches with that of a slot of the stator core in a rotating electrical unit of the embodiment of the present invention. Then, the coil component 10 is inserted into the corresponding slot. Therefore, the lamination factor of the conductor wires increases in a slot. Accordingly, the efficiency of a rotating electrical unit is improved. In addition, if a flat conductor wire is used as the conductor wire, the lamination factor of the conductor wires can be further increased in a slot in comparison with a case where a circular conductor wire is used.

In the case where the conductor wire 11 is wound around the forming tool 20, conductor wires sometimes intersect with each other. For example, in the example as shown in FIGS. 8A to 8B, the fourth-turn conductor wire intersects with the third-turn conductor wire as if the former runs on the latter. This intersection distorts the alignment of conductor wires. That is, at a part where conductor wires intersect with each other, a cross-section shape of the coil component 11 may not maintain the predetermined cross-section shape (in the above-mentioned example, a "trapezoid" or a "rectangle") so that the component may not be inserted into a slot of the stator core.

Therefore, according to the production method of the embodiment of the present invention, the conductor wires 11 are wound around the forming tool 20 so as not to intersect with each other at an area to be inserted into the slot of a stator core in the step of producing the conductor wire 10. For example, in the example as shown in FIG. 5, the coil component 10 is formed in such a way that the conductor wires 11 do not intersect with each other at an area enclosed with a broken line. Therefore, at apart where the conductor wire is inserted into the slot of a stator core, the cross-section shape of the coil component 10 approximately matches with the cross-section shape of the slot without distorting the alignment of the conductor wires 11.

Figure 9A:
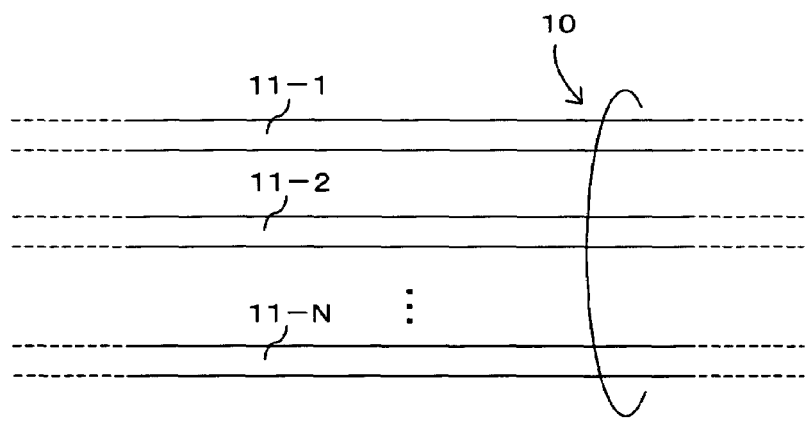
FIGS. 9A to 9C explain the cutoff/connection of coil components.

Subsequently, a coil is formed by connecting the end portions 12a and 12b of the coil component 10 installed at the stator core 50. The following is the explanation of a method of connecting the end portions 12a and 12b of the coil component 10 in reference to FIGS. 9A to 9C. Here, it is assumed that the coil component 10 is formed by winding the conductor wire 11 around the forming tool 20 by N times as shown in FIG. 9A. Meanwhile, the first turn to the N-th turn conductor wires are called conductor wires 11-1 to 11-N, respectively.

Figure 9B:
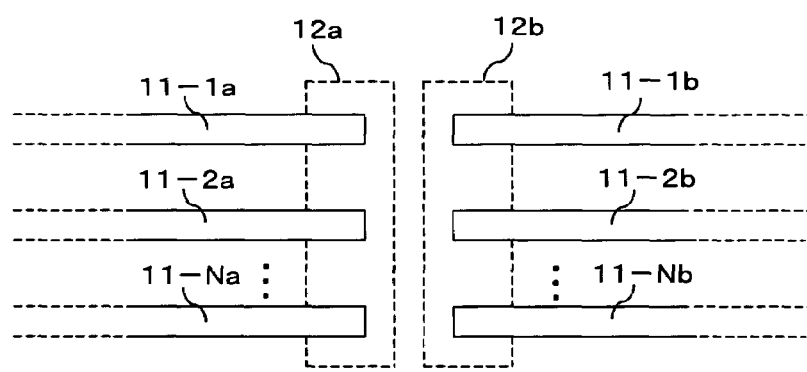

As mentioned above, the coil component 10 is cut off at a predetermined point. That is, the conductor wires 11-1 to 11-N are respectively cut off as shown in FIG. 9B. Here, a "predetermined point" is a point other than a point to be inserted into the slot of a stator core. Hereinafter, the conductor wires on the end portion 12a side of the coil component 10 are called 11-1a to 11-Na, while the conductor wires on the end portion 12b side of the coil component 10 are called 11-1b to 11-Nb.

Figure 9C:
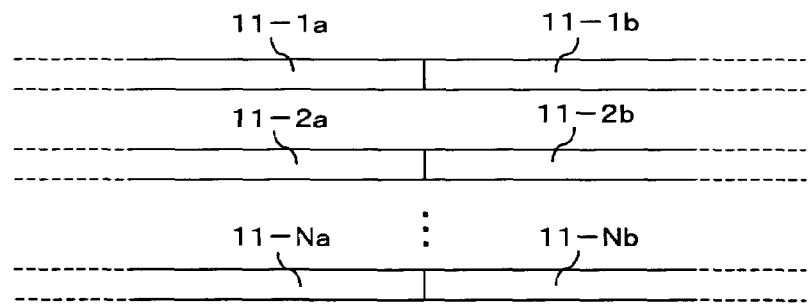

The coil component 10 that is cut off at a predetermined point is installed at the stator core 50 as shown in FIGS. 4A to 4C. Then, end portions of corresponding conductor wires are electrically connected at cut surfaces (end portions 12a and 12b) of the coil component 10. Specifically, as shown in FIG. 9C, the respective end portions of the conductor wires 11-1a to 11-Na and the respective end portions of the conductor wires 11-1b to 11-Nb are electrically connected, respectively in such a way that the respective cut-off conductor wires 11-1 to 11-N are restored to a state before the cutoff.

Consequently, the coil component 10 becomes a coil installed at the stator core. In the present embodiment, the coil component 10 is inserted into a corresponding slot so as to cross over a plurality of slots like a wave. Accordingly, wave winding is formed by the coil component 10.

A method of electrically connecting the end portions of the conductor wires 11 is not specially limited so that this method can be realized in various ways. For example, the end portions of the conductor wires may be connected by soldering or by various welding (including laser welding, resistance welding and arc-welding). In addition, as shown in FIG. 10A, one end portion of a set of conductor wires to be connected is processed as a male type while the other end portion is processed as a female type. Then, these conductor wires are pressure-bonded while fixing to each other.

Otherwise, as shown in FIG. 10B, a plurality of sets of conductor wires may be simultaneously connected using a set of connectors. Furthermore, as shown in FIG. 10C, a plurality of sets of conductor wires may be connected using one connector.

In the production method of the embodiment of the present invention, the ends of each conductor wire are connected in such a way that the cut-off conductor wires are restored to the original state as explained in reference to FIGS. 9A to 9C. Furthermore, at the cut surfaces of the coil component 10, conductor wires forming the coil component 10 are aligned in a predetermined pattern as shown in FIG. 6 or FIG. 7B. Thus, a connector for connecting ends of each conductor wire is realized not by a complicated configuration such that conductive paths intersect with each other inside the connector, but by a simple configuration such that conductor wires arranged at the same position (refer to FIG. 10C) are connected to each other so that the connector itself can be miniaturized. Therefore, this realization contributes to the miniaturization of a rotating electrical unit.

In addition, two other coil components are installed at the stator core 50 and a coil is configured in the same method. Then, after the coil components 10 (that is, coils) are installed at the inner-circumference member 51 of the stator core 50 in this way, the outer-circumference member 52 is fixed to wrap the inner-circumference member 51. Thus, the stator of a rotating electrical unit is configured.

In this way, in the production method of a rotating electrical unit of the embodiment of the present invention, the coil component 10 is formed by repeatedly winding the conductor wires 11 around the forming tool 20 and the thus-formed coil component 10 is cut off at a predetermined point, thereby installing the cut-off coil component at a stator core. Then, a coil is formed by electrically connecting both ends of the coil component 10 at the cut surfaces. At this time, the operation of installing the coil component 10 at the corresponding slot is much easier in comparison with the operation of directly winding a conductor wire around the stator core. Furthermore, in a production method of the embodiment of the present invention, an expensive device as required in the insert method is not required anymore.

Furthermore, in the production method of the embodiment of the present invention, since the preliminarily formed coil component 10 is inserted into the slot of a stator core, a plurality of conductor wires 11 are easily aligned so as to approximately match with the cross-section shape of the slot. Therefore, the lamination factor of the conductor wires can be increased in a slot, thereby improving the efficiency of a rotating electrical unit.

In the production method of the embodiment, before the coil component 10 is inserted into the slot of a stator core, an insulation processing may be performed for the coil component 10. The insulation processing is not especially limited here but this processing may be a processing of covering the coil component 10 contained in the slot with insulating paper, an insulating film, a resin material, etc., for example, when the coil component 10 is installed at the stator core. If such procedures are introduced, the insulating paper, etc. need not be inserted in advance into the corresponding slot of the stator core, and the insulation between the coil and the stator core can be acquired only by inserting the insulated coil component 10 into the corresponding slot. In addition, the alignment of a plurality of conductor wires for forming the coil component 10 can be maintained by performing such an insulation processing.

Figure 11A:
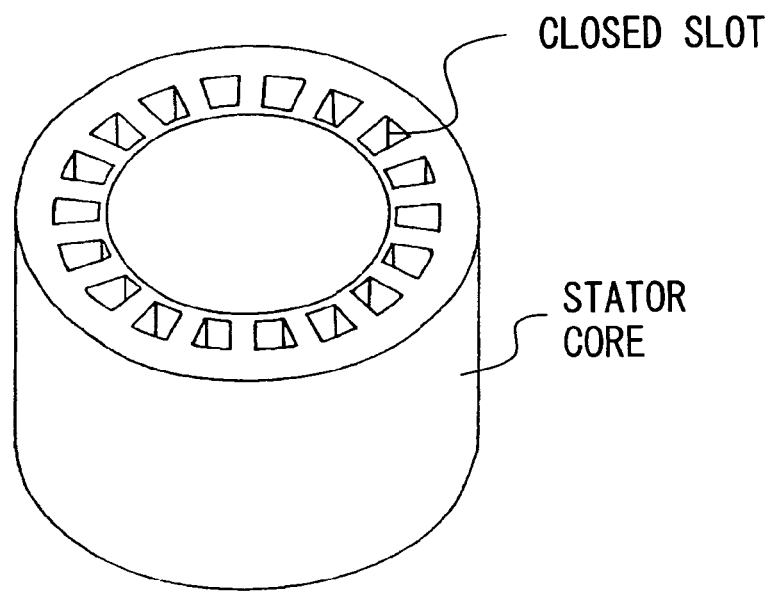
FIGS. 11A and 11B show an embodiment in the case of applying the present invention to the stator of a closed slot.
Figure 11B:
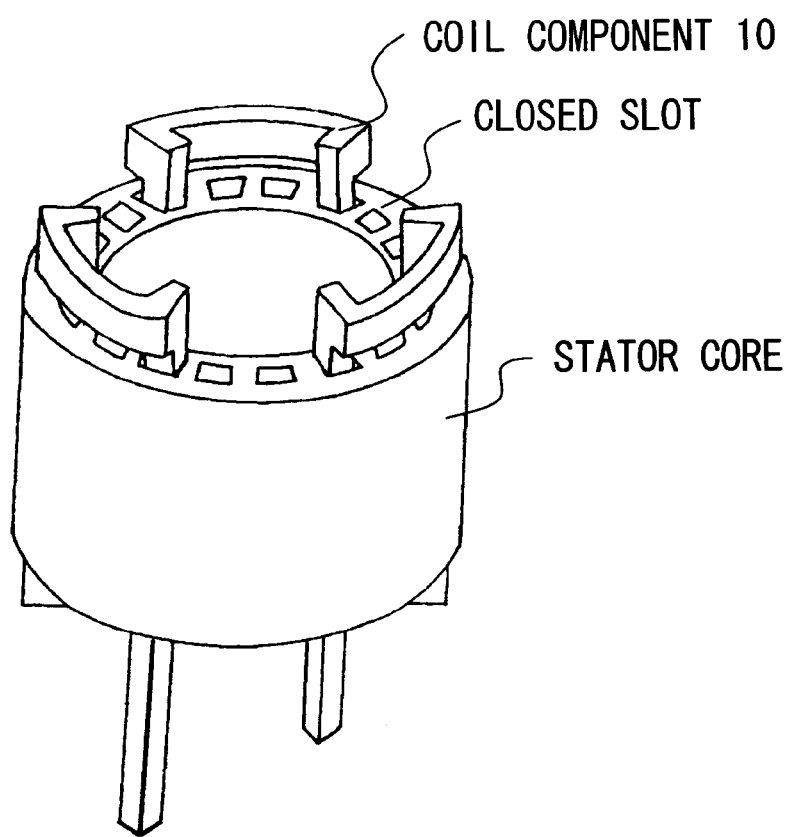

In the above-mentioned embodiment of the present invention, the slot provided at the stator core is an open slot, but the present invention is not limited to such as lot. That is, the present invention may be applied to a stator core having a closed core as shown in FIG. 11A. An "open slot" indicates a configuration in which a slot is open in the outer-circumference direction of a stator core (refer to FIG. 2) or a slot is open in the inner-circumference direction of a stator core (refer to FIG. 7A). On the other hand, a "closed slot" indicates a configuration in which a slot is open neither in the outer-circumference direction nor in the inner-circumference direction of a stator core and this slot is realized by a through bore for enabling a conductor wire to pass through therein. In the case where the present invention is applied to a closed slot, the coil component 10 is installed at a stator core in such a way that the coil component sequentially penetrates a plurality of corresponding closed slots as shown in FIG. 11B. Then, connectors are provided at both ends of the coil component 10 and the set of these connectors are connected to each other.

In the case where the slot provided at a stator core is a semi-closed slot (the slot is open in the outer-circumference direction or in the inner-circumference direction but the aperture width of the slot is narrower than the width in the circumference direction in the slot), the present invention may be applied in the same way as the case of a closed slot.

Furthermore, the rotating electrical unit is not limited to a three-phase rotating electrical unit and the number of poles of each phase is not limited to "6". For example, if the number of poles of each phase is "4", the coil component 10 crosses four slots, and if the number of poles of each phase is "8", the coil component 10 crosses eight slots.

In the above-mentioned embodiment, the present invention is applied to a rotating electrical unit (especially, an armature thereof), but it may be also applied to a linear motor and an induction machine (especially, armatures thereof). Meanwhile, the armature includes an armature iron core and a coil, generates an electro motive force and functions as a part for flowing a main electric current therein. The present invention is widely applied to an armature used for a rotating electrical unit, a linear motor and an induction machine.

What is claimed is:

1. A motor comprising:
    an armature iron core provided with a plurality of slots each having a cross section of a quadrilateral with exactly one pair of parallel sides; and
    a pre-fabricated coil component installed in the plurality of slots of said armature iron core where the cross section of said pre-fabricated coil component is a quadrilateral with exactly one pair of parallel sides, which is substantially the same as the cross section of each of the plurality of slots,
    wherein said pre-fabricated coil component comprises a plurality of conductor wires, each having a rectangular cross section, electrically insulated from each other and includes at least two or more connecting portions where the plurality of conductor wires are cut and connected subsequently in such a way that the plurality of conductor wires are serially connected,
    wherein the at least two or more connecting portions of said pre-fabricated coil component are located outside of the plurality of slots of said armature iron core and are arranged successively adjacent to each other, and
    wherein the cross section of said pre-fabricated coil component includes two or more rows of conductor wires and each of the rows comprises at least two conductor wires so as to form a shape of a quadrilateral with exactly one pair of parallel sides.

2. The motor according to claim 1, wherein the motor is a rotating electric unit.

3. The motor according to claim 1, wherein said coil component comprises a set of connectors at both ends, and said set of connectors electrically connect the ends of the plurality of conductor wires as one bundle so that the plurality of conductor wires are serially connected.

4. A generator comprising:
an armature iron core provided with a plurality of slots each having a cross section of a quadrilateral with exactly one pair of parallel sides; and
a pre-fabricated coil component installed in the plurality of slots of said armature iron core where the cross section of said pre-fabricated coil component is a quadrilateral with exactly one pair of parallel sides which is substantially the same as the cross section of each of the plurality of slots,
wherein said pre-fabricated coil component comprises a plurality of conductor wires, each having a rectangular cross section, electrically insulated from each other and includes at least two or more connecting portions where the plurality of conductor wires are cut and connected subsequently in such a way that the plurality of conductor wires are serially connected,
wherein the at least two or more connecting portions of said pre-fabricated coil component are located outside of the plurality of slots of said armature iron core and are arranged successively adjacent to each other, and
wherein the cross section of said pre-fabricated coil component includes two or more rows of conductor wires and each of the rows comprises at least two conductor wires so as to form a shape of a quadrilateral with exactly one pair of parallel sides.

* * * * *

UNITED STATES PATENT AND TRADEMARK OFFICE
CERTIFICATE OF CORRECTION

PATENT NO. : 7,352,097 B2
APPLICATION NO. : 10/965497
DATED : April 1, 2008
INVENTOR(S) : Hiroshi Fukasaku et al.

It is certified that error appears in the above-identified patent and that said Letters Patent is hereby corrected as shown below:

In the Specification

Column 4, line 21, please delete "stator core of embodiment." and insert therefore
-- stator core of the embodiment. --;

Column 4, line 66, please delete "coil component 10 upper end" and insert therefore
-- coil component 10→upper end --;

Column 6, line 11, please delete "at apart where the conductor" and insert therefore -- at a part where the conductor --;

Column 7, line 61, please delete "is not limited to such as lot." and insert therefore -- is not limited to such a slot. --; and Column 8, line 29, please delete "electro motive force" and insert therefore
-- electromotive force --.

In the Claims

In Claim 1, column 8, lines 37, 40-41, 43, 47 and 56, please delete "cross section" and insert therefore -- cross-section --;

In Claim 4, column 9, lines 3, 6-7, 9, and 13, please delete "cross section" and insert therefore -- cross-section --; and

UNITED STATES PATENT AND TRADEMARK OFFICE
CERTIFICATE OF CORRECTION

PATENT NO.        : 7,352,097 B2
APPLICATION NO. : 10/965497
DATED             : April 1, 2008
INVENTOR(S)       : Hiroshi Fukasaku et al.

It is certified that error appears in the above-identified patent and that said Letters Patent is hereby corrected as shown below:

In Claim 4, column 10, line 8, please delete "cross section" and insert therefore -- cross-section --.

Signed and Sealed this

First Day of September, 2009

David J. Kappos
*Director of the United States Patent and Trademark Office*